United States Patent [19]

George

[11] Patent Number: 5,403,379

[45] Date of Patent: Apr. 4, 1995

[54] REDUCTION OF TITANIFEROUS ORES AND APPARATUS

[75] Inventor: Ivan W. George, Booragoon, Australia

[73] Assignee: RGC Mineral Sands Limited, Geraldton, Australia

[21] Appl. No.: 60,756

[22] Filed: May 12, 1993

[51] Int. Cl.6 .............................................. C21B 13/08
[52] U.S. Cl. ...................................... 75/478; 266/173
[58] Field of Search ............................ 75/478; 266/173

[56] References Cited

U.S. PATENT DOCUMENTS 2,823,108  2/1958  Gerlach .................................. 75/478
4,337,084  6/1982  Keran et al. .......................... 75/478

Primary Examiner—Melvyn J. Andrews
Attorney, Agent, or Firm—Harness, Dickey & Pierce

[57] ABSTRACT

A process for treating titaniferous material by treating the titaniferous material and a particulate carbonaceous material in a kiln, recovering reduced titaniferous material and particulate char from the kiln and separating the particulate char, recycling the recovered separated char to the kiln in the region of the discharge port by blowing the char entrained in a fluid stream so that the blown char burns in the kiln largely as a flame in the region of the discharge port.

34 Claims, 2 Drawing Sheets

REDUCTION OF TITANIFEROUS ORES AND APPARATUS

This invention relates to a process for the reduction of titaniferous ores, such as ilmenite, in a rotary kiln, using a carbonaceous material as the reducing agent and the source of heat. More particularly this invention relates to such processes whereby at least 85% of the iron contained in the titaniferous ore is reduced to the metallic iron state and subsequently the metallic iron is largely removed to leave a titanium dioxide ($TiO_2$) rich residue known as synthetic rutile.

Ilmenite, altered ilmenites and rutile are the major, commercially-important mineral feedstocks for titanium metal and titanium dioxide pigment production. Most of the world's mined ilmenite is used for the production of titanium dioxide pigments for use in the paint and paper industries. Pigment grade $TiO_2$ has been traditionally produced by reacting ilmenite with concentrated sulphuric acid and subsequent processing to produce a $TiO_2$ pigment—the so-called sulphate route. However this process is becoming increasingly unacceptable on environmental grounds due to the large volumes of acidic liquid wastes which it produces. The alternative process - the so-called chloride route—involves reaction with chlorine to produce volatile titanium tetrachloride and subsequent oxidation to $TiO_2$. Unlike the sulphate route, the chloride route is capable of handling feedstocks, such as rutile, which are high in $TiO_2$ content and low in iron and other impurities.

Consequently the chloride-route presents fewer environmental problems and has become the preferred method for $TiO_2$ pigment production. Also whilst the sulphate route is capable of producing only $TiO_2$ pigments, both titanium metal and $TiO_2$ pigments can be produced via the chloride route. Natural rutile supplies are insufficient to meet the world demands of the chloride-route process. Thus there is an increasing need to convert the more-plentiful ilmenites and altered ilmenites (typically 45 to 62% $TiO_2$) to synthetic rutile (containing over 90% $TiO_2$).

In the chloride route process, chlorine used to produce titanium tetrachloride is recovered at oxidation and reused. However chlorine consumed by the major impurity, iron, and other impurities is normally not recovered but reports as a waste product such as ferrous chloride. Thus in order to reduce chlorine consumption and the quantities of wastes produced, there is a need to produce a synthetic rutile which is high in $TiO_2$ content and low in iron and other impurities. This latter need is an objective of this invention.

Another objective is to provide a process which, at least in one or more preferred embodiments, is simpler to operate and requires fewer changes once optimum conditions have been established.

Several processes are known for the production of synthetic rutile. The most commonly-practised process involves the following main stages:

1. Reduction, in a rotary kiln, of the iron oxides contained in the ilmenite feed largely to metallic iron using coal as the heat source and the reductant.
2. Cooling of the solids discharging from the reduction kiln.
3. Dry physical separation of the reduced ilmenite and surplus char.
4. Aqueous oxidation (known as aeration) of the reduced ilmenite to convert the metallic iron to iron oxide particles discrete from the $TiO_2$—rich mineral particles.
5. Wet physical separation to remove the iron oxide from the $TiO_2$—rich mineral.
6. An optional acid leaching stage to remove a portion of the residual iron and manganese, as later described.
7. Washing, dewatering and drying of the synthetic rutile product.

This invention is concerned with improvements to the first stage.

In a simplified form, the reduction of ilmenite ($FeTiO_3$) using a carbonaceous material, such as coal, can be expressed by the following two reactions:

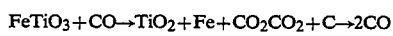
$$FeTiO_3 + CO \rightarrow TiO_2 + Fe + CO_2 \quad CO_2 + C \rightarrow 2CO$$

In the first simplified reaction, the ilmenite is reduced to $TiO_2$ and metallic iron using CO which is oxidised to $CO_2$. In the second reaction, known as the Boudouard reaction, carbon ie char from the coal regenerates CO. The reduction of titaniferous ores requires very strong reducing conditions, that is a high ratio of $CO:CO_2$. This in turn requires a coal char which is highly reactive with respect to $CO_2$ to ensure that a high $CO:CO_2$ ratio gas is produced by the Boudouard reaction. Coals suitable for ilmenite reduction need to have, inter alia, a high char reactivity.

Reduction to metallic iron is affected by the presence of small mounts of manganese and magnesium in the ilmenite feedstock. Manganese and magnesium stabilise pseudobrookite solid solutions, typically having a formula $(FeTi_2O_5)_a (MnTi_2O_5)_b (Ti_3O_5)_c$ where $a+b+c=1$, and in so doing render the iron, so contained, unavailable for metallisation. A known improvement to the reduction process is to add small amounts of sulphur or a sulphur—containing material to the ilmenite feed to segregate a part of the manganese and magnesium as sulphides and thereby decrease the amount of pseudobrookite formed and increase the proportion of iron available for conversion to metallic iron. A small amount of iron is also convened to its sulphide. The iron, manganese and magnesium sulphides so formed are removed at the acid leaching stage.

The synthetic rutile process removes the bulk of the iron present in the ilmenite feed, mostly as iron oxide and to a minor extent as iron sulphide. It may also remove a portion of the manganese and magnesium as sulphides (although magnesium removal is not usually a major concern as most ilmenites are low in magnesium). The removal of iron, manganese and magnesium impurities increases the $TiO_2$ content. However, the synthetic rutile process does not aim to remove other impurities such as alumina, silica and zircon although some such impurities may be removed as discrete particles as non-magnetics at the dry separation stage. Thus it will be understood that the $TiO_2$ content of the final synthetic rutile product is determined not solely by the extent of iron, manganese and magnesium removal but also by the levels of other impurities present in the ilmenite feed which vary with the source of the ilmenite.

Figure 1:
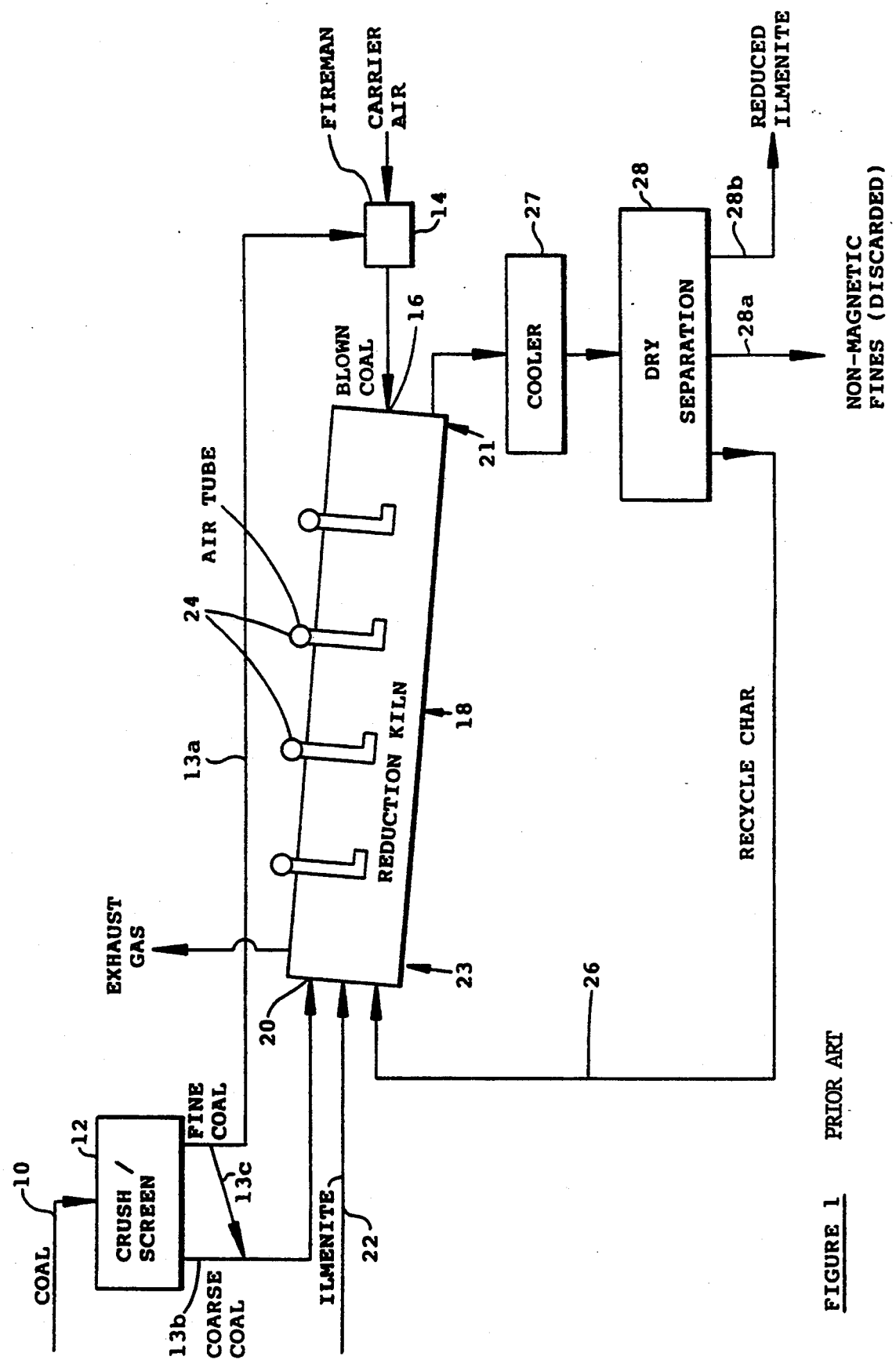
FIG. 1 is a schematic drawing showing the prior art kiln reduction processes for ilmenite ore.

The reduction stage of a known process, as it is presently practised, is depicted diagrammatically in FIG. 1. Incoming coal 10 is first split into two size fractions, typically plus 10 mm and minus 10 mm, by screening or by crushing and screening (12). Typically 20 to 40% of the total coal, comprising only the fine sized fraction 13a, is fed into the discharge end 21 of the reduction kiln by pneumatic means 14 known as a fireman and consequently is usually referred to as blown coal. The blown coal is injected (16) into the rotary kiln 18 at high velocity, landing on the kiln bed where it then burns. The remaining coal, typically 60 to 80% of the total and comprising the coarse-sized fraction 13b and surplus fine-sized coal 13c is fed to the feed end 23 of the kiln (20) together with the ilmenite (22).

A number of air tubes 24, typically 6 to 10 mounted at approximately equally-spaced distances along the kiln, each fitted with an externally—mounted air fan provide the combustion air. The temperature profile of the gases and the solids bed is controlled, inter alia by regulating the amount of air at each shell fan. The gases travel counter-current to the solids. Typically, in the known process, the solids bed temperature is in the range of 1130° to 1180° C. near the kiln discharge end and 950° to 1000° C. at the middle of the kiln. Gas temperatures are 150° to 200° C. higher than the corresponding bed temperatures.

In order to maintain reducing conditions in the critical zone near the discharge end of the kiln and also to avoid sintering of the solids, the coal feed rates are adjusted so that some incompletely burned coal, that is char, is present along with the reduced ilmenite discharged. In the known process the ratio of reduced ilmenite to char discharged is normally maintained in the range of 7:1 to 10:1. This surplus char is subsequently separated from the reduced ilmenite in dry separation stage 28 and for reasons of coal economy is returned (26) to the feed-end of the kiln along with the ilmenite (22) and the feed-end coal (20).

Various methods of feeding coal to a reduction kiln have been proposed including feeding all of the coal to the discharge end as blown coal. Devices for feeding coal to the centre of the kiln have also been proposed. However the method universally employed, hitherto, has been to feed coal to both ends of the kiln, as described in detail above and broadly disclosed by Hockin in Australian patent 423,616. This combination of feed-end and blown coal allows control of the temperature profile whilst ensuring that reducing conditions are maintained.

Hockin in Australian patent 423,616 stresses the need to ensure that (a) no blown coal lands within 20% of the discharge end of the kiln otherwise a number of problems can occur including a marked reversal of reduction, a high level of char consumption and an unsatisfactory temperature profile and (b) the coal should be distributed as evenly as possible along the length of the kiln, otherwise the coal landing in a heap causes a marked drop in temperature where it lands and adversely affects reduction in that zone.

A problem with the Hockin Process is that the sizing distribution of the fine blown coal varies, frequently from hour to hour. The sizing distribution affects the distance the coal travels along the kiln before landing on the bed. Consequently, frequent adjustments have to be made to the shell tube air flow rates to maintain the required temperature profile along the kiln. Also the coal sizing distribution may be such that the coal is not evenly distributed along the bed.

Keran and Baker in both U.S. Pat. Nos. 4,337,084 and 4,375,883 propose a process in which char is introduced to the discharge end rather than the feed end of the kiln. In the Keran and Baker process, the char, with or without blown coal is returned directly to the kiln bed where it then burns and thus suffers from the same sizing distribution problems as the Hockin Process. Moreover as the char sizing is vastly different from the coal sizing, we consider that in practice it would not be possible to maintain a satisfactory temperature profile by their preferred use of both blown coal and blown char.

In accordance with the invention, it has been realised that substantial benefits may be gained, and problems with the Hockin and Keran/Baker processes overcome, by feeding all of the coal to the feed end and recycling char as blown char to the discharge end of the kiln in such a way that the blown char burns largely as a flame near the discharge end of the kiln.

The invention accordingly provides, in one aspect, a process for treating titaniferous material, eg an ore such as ilmenite, by reducing iron oxides in the titaniferous material largely to metallic iron in a kiln, preferably an elongated rotary kiln, thereby producing a reduced titaniferous material, comprising feeding the titaniferous material and a particulate carbonaceous material to the kiln at one or more feed port means, recovering a mixture which includes the reduced titaniferous material and particulate char from the kiln at one or more discharge port means, and recycling at least a portion of the recovered char to the kiln in the region of said discharge port means, wherein said recycled char is fed to the kiln by blowing the char entrained in a fluid stream so that this blown char burns in said kiln largely as a flame in the region of said discharge port means.

The invention further provides, in another aspect, apparatus for treating titaniferous materials, eg an ore such as ilmenite, by reducing iron oxides in the titaniferous material largely to metallic iron, thereby producing a reduced titaniferous material, comprising:
 a kiln, preferably an elongated rotary kiln:
 one or more feed port means for the kiln for feeding titaniferous material and a particulate carbonaceous material to the kiln; and
 one or more discharge port means for recovering a mixture which includes reduced ilmenite and particulate char from the kiln;
 means to separate at least a portion of the recovered particulate char from said mixture and to recycle that portion to the kiln in the region of said discharge port means, which recycling means includes means to entrain said portion of the recovered particulate char in a fluid stream and means to blow said entrained char into the kiln;
 wherein said separation and recycling means is such that the blown char burns in said kiln largely as a flame in the region of said discharge port means.

The feed and discharge ports are preferably at or adjacent opposite ends of the kiln, which is preferably inclined to facilitate flow of the contents of the kiln from the feed end towards the discharge end.

The fluid stream is preferably a gas such as air.

Preferably, no recovered char is recycled to the feed end of the kiln and no carbonaceous material, other than the char, is fed to the discharge end of the kiln.

The carbonaceous material is preferably coal.

It has been found that the process of the invention, at least when practised according to the preferred embodiment, requires fewer operational changes once optimum conditions have been established, yields a higher quality product and requires less coal.

Although the blown-coal process has been employed on a commercial scale for the past twenty years, it has been considered hitherto that a high volatile content coal was necessary in order to maintain combustion of the blown fuel at a rate sufficient to allow the reduction kiln to be controlled at the required temperatures. (Hockin states that suitable coals contain more than 25% by weight of volatiles). We have found that this is not necessarily the case. In the blown-char process according to the invention, it has been found that the required temperatures can be along the kiln using the recovered char which typically contains only 1% volatile matter.

For convenience hereinafter, the process according to the invention is referred to as the blown char process to distinguish it from the known blown-coal process.

Figure 2:
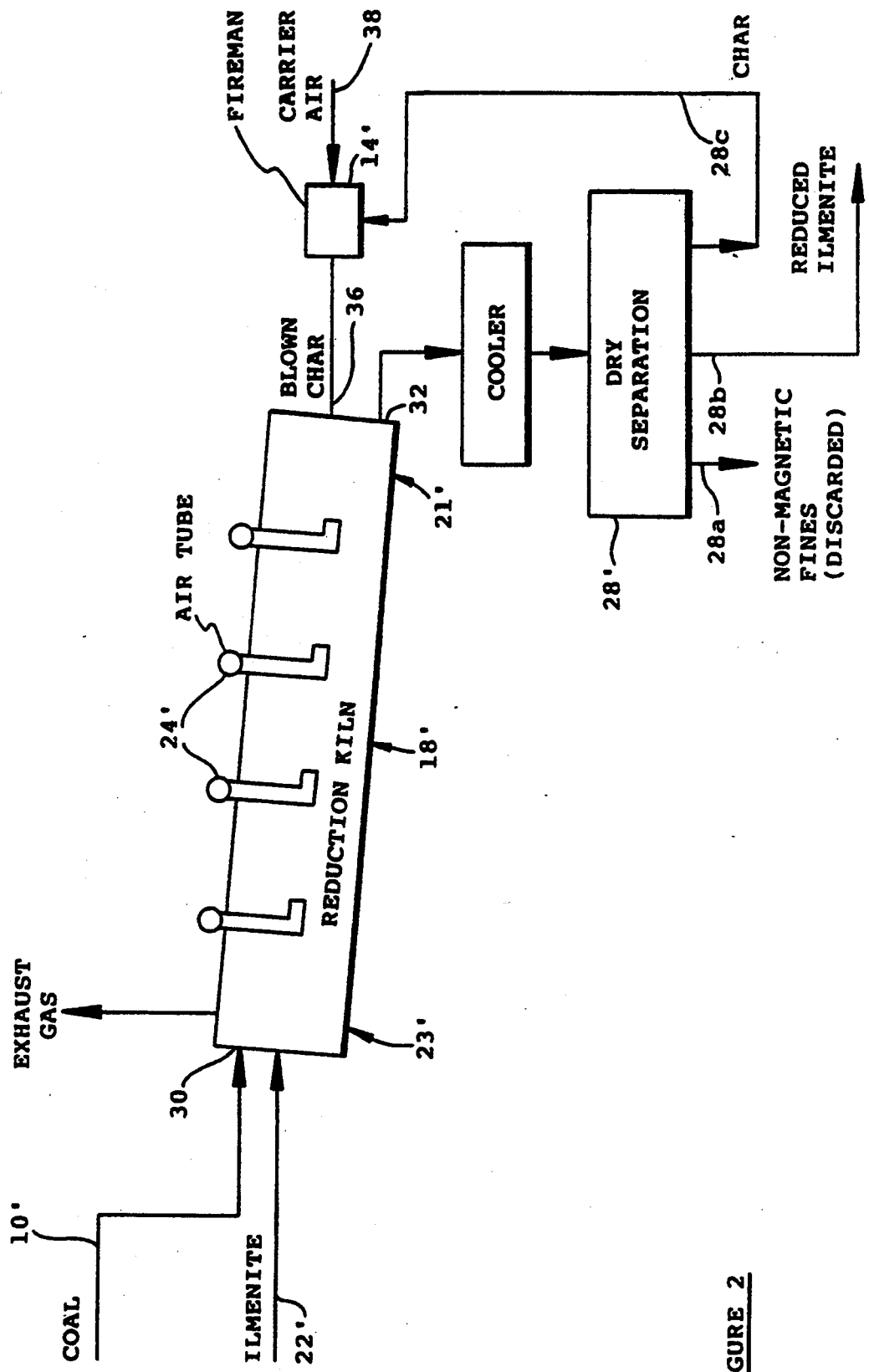
FIG. 2 is a schematic drawing showing the kiln reduction process for ilmenite ore of the present invention.

A preferred embodiment of the blown char process according to the invention is depicted in FIG. 2. Like parts corresponding to like parts in FIG. 1 are indicated by similar primed reference numerals. The input coal 10' is now entirely delivered to the feed end 23' of the inclined rotary kiln 18' along with the ilmenite 22', via feed port 30. The mixture of reduced titaniferous material and particulate char is recovered at discharge end 21' via discharge port 32. The recovered mixture is cooled at 27' and then processed in a dry separation stage 28'. A non-magnetic fines fraction 28a is discarded and a reduced ilmenite fraction 28b is passed for future processing. At least a portion of the char fraction 28c is recycled to the discharge end 21' of the kiln by being blown at 36, entrained in an air stream 38 with which it is mixed in a fireman 14'.

In the process of the present invention, as already mentioned, the blown char burns largely as a flame in the region of the discharge port of the kiln, i.e. near the discharge end with the preferred kiln. Thus the problems inherent in the Hockin and the Keran and Baker processes, wherein coal and/or char lands on the bed before burning, are eliminated. By the phrase "burns largely as a flame" is meant herein that at least 90% and preferably more than 95% of the char is burned to a gas mixture, the remainder landing on the bed. The gas mixture typically comprises CO, $CO_2$ and $N_2$ at a temperature normally in the range 1200° to 1360° C. As the gas mixture travels towards the feed end of the kiln, the CO present is burned progressively to $CO_2$ by the shell tube air, and the heat so generated is transferred from the gaseous phase to the solids bed.

In the known blown-coal process (FIG. 1 ), the reduced ilmenite and surplus char mixture discharging from the reduction kiln, pass through a rotary cooler 27 and then to the dry separation stage 28 of the process. The dry separation stage comprises of a series of vibrating screens and magnetic separators. A large aperture (typically 15 mm) screen removes any sintered lumps which are discarded. The undersize material passes to a second and smaller aperture (typically 0.85 mm) screen which retains the bulk of the char which is subsequently returned to the reduction kiln. The undersize from this second screen passes to a series of magnetic separators where the magnetic reduced ilmenite fraction 28b is recovered and the non-magnetic fraction 28a, largely comprising coal ash and some very fine char is discarded. The improved process (blown char) may use the same separation processes at dry separation stage 28'. It is possible, however, that it may be preferable to reduce the second screen aperture, eg from 0.85 mm to 0.53 mm, in order to increase the quantity of char recovered. This reduction of screen aperture may not be desirable, on the other hand, if the finer char has a substantially higher ash content. It will be understood that these screening operations are not 100% efficient in that some char finer than the screen aperture size is retained on the screen. We have found that char recovered by this screening process is of a sufficiently fine size that it can be returned direct to the reduction kiln as blown char. The char is of sufficient size for combustion without the need for crushing or other means of size reduction. It is to be understood, however, that the invention extends to processes in which the recovered char is subjected to mechanical size reduction, eg crushing or grinding.

Unexpectedly, we have found that char produced (and returned to the reduction kiln) by the blown-char method is substantially finer than produced by the blown-coal method. In one set of trials (using separation screens of the same size), char recovered from blown char operation had a mean particle diameter of 1.2 mm compared to a mean particle diameter of 2.4 mm when operating on the known blown-coal process. In another set of trials, using separation screens of the same size, the char from blown char operation had a mean particle diameter of 1.5 mm compared to a mean particle diameter of 2.8 mm on blown coal operation. It is thought that, in general, the process can be operated so that the mean particle diameter of the recovered char is no greater than 2.0 mm.

Contrary to what may be expected we have also found that the char size produced, whether on blown coal or blown char operation is not noticeably affected by the size of the coarse feed-end coal. We have also found unexpectedly that char produced from the kiln during blown-char operation in accordance with the present invention has a lower and more consistent ash content, typically 10 to 16%, compared to char produced whilst on known blown-coal operation, typically 10 to 40% ash.

Whilst not wishing to be bound by theoretical explanations, we believe that the ability of blown char to burn largely as a flame and at a sufficient rate as to maintain the required temperatures, rather than largely falling on the bed as in the Hockin and Keran/Baker processes, is due largely, if not entirely, to the unexpected finer sized char produced and returned. In blown char trials, using the coarser char produced from blown coal operation, kiln temperatures could not be maintained for long periods. In turn, we believe that the finer char produced is due to its unexpected lower ash content, low ash chars being more fragile resulting in greater size degradation at the rotary cooler, vibrating screens and other handling stages. In turn, we believe that the lower and more consistent ash content is due to the blown char burning largely as a flame rather than landing and then burning on the kiln bed. When burning as a flame, the blown char is burned virtually to ash which is removed as nonmagnetics at the dry separation stage. The char produced comes from the once-through feed end coal. In the case of blown coal, up to 10 mm size, landing on the bed, part of this coal becomes incorporated into the bed due to the rotation of the kiln and therefore is only partly burned yielding on ash-rich char. Thus some char produced on blown coal operation will be re-cycled to the feed end several times becoming progressively richer in ash content. In addition, we believe that high volatile content coals are required not for the reasons previously stated in the literature, that is to ensure a sufficiently high rate of combustion but rather that coals capable of producing chars highly reactive to $CO_2$ for the Boudouard reaction, seem invariably to be high volatile content coals. As devolatisation of the coal proceeds during heating in the reduction kiln, high volatile coals will produce highly porous chars providing a large surface area exposed for reaction with $CO_2$.

Those skilled in the prior art will be aware that there is, as yet, no precise means of determining the optimum feed rates of blown coal and feed-end coal. Different operations use different ratios of blown coal to feed-end coal and, even allowing for differences in kiln sizes, there are very substantial differences in total (blown plus feed-end) coal consumption per unit of say ilmenite feed. By contrast, the blown char process provides a relatively simple means of determining the optimum rates. For reasons explained, we have found that the percentage ash in the char is a valuable means of determining the maximum blown char rates. If the ash content generally exceeds 15%, it indicates an excess of blown char and the char feed rate should be reduced. The minimum blown char rate is determined by the bed temperature at the mid point of the kiln (typically 950° to 1000° C). Low or unstable mid-kiln bed temperatures indicates insufficient blown char. The coal feed rate (all to the feed end) is adjusted simply as required to establish a char balance, that is to produce just sufficient from the dry separation stage char for return as blown char.

Accordingly, it is preferred that the process is operated so that the particulate char recovered from the discharge port 32 has an ash content less than 25%, preferably in the range 5 to 15%. Preferably, the rate at which recovered char is blown into the kiln is controlled to maintain the ash content of the recovered char in these ranges. Most preferably, this rate is held sufficiently low to maintain said ash content at or below 15%.

To set up the interdependent cycle of fine char/low ash/flame burning, or if the cycle is broken, it is typically necessary to operate the kiln at a lower ilmenite feed rate in order to maintain the required temperatures until the cycle is (re-established).

We also believe that there are several reasons for the lower coal usage. One is that in the known process, the recovered char is returned to the feed end of the kiln where we have found that a substantial proportion of that char is lost as dust carryover to the exhaust gas system whereas in the blown char process the char enters at the solids discharge end and essentially is completely burned. Another reason relates to the statement made earlier that in the known process the ratio of reduced ilmenite to char in the kiln discharge is normally in the range of 7:1 to 10:1 in order to maintain reducing conditions towards the discharge end of the kiln and also to avoid sintering of the solids. As we expected, when on blown-char operation such high ratios of reduced ilmenite to char are not required to maintain the extreme reducing conditions needed for ilmenite reduction. However, to our surprise, the higher reduced ilmenite to char ratios, on blown-char operation, do not result in sintered lump formation and the consequent risk of kiln discharge chute blockages which occurs on blown-coal operation when kiln solids discharge temperatures accidentally increase to over 1200° C.

As earlier indicated, in operating the blown-char process, at least when using coal as specified in Example 1, the coal feed rate is preferably adjusted simply as required to maintain a char stock balance, that is, to ensure only that sufficient char is produced to maintain the required blown-char feed rate. All operations worldwide employing the synthetic rutile process, described above, are located in Western Australia and use the same high moisture, high volatile content coal specified in Example 1.

As stated, the ash content of the char in the prior art process varies widely, typically between 10 and 40%. In order to prevent ash levels becoming even higher, a portion of the char recovered from the dry separation stage is not recycled but is discarded. This requires higher coal feed rates than otherwise would be the case. Recycling high ash chars to the kiln is undesirable, increasing the kiln heat demand and increasing the risk of sinter formation. In the preferred blown-char process according to the invention the ash content of the char is lower and more consistent such that producing and discarding surplus char is not necessary.

The relatively simple means of determining optimum blown char and feed-end coal rates, and especially the avoidance of the potential problems using blown coal described by Hockin, results in a process which is easier to control, is not affected by changes in coal sizing and requires infrequent changes to operating parameters once the optimum conditions have been established.

In addition, the blown-char process provides major capital cost savings for a new operation. Equipment for screening or screening and crushing of coal is not required. (This in turn leads to the elimination of costs for the operation and maintenance of such equipment). Coal conveying and consequently plant layout is much simpler, yielding further substantial capital cost savings.

It was expected that the replacement of blown coal with blown char would improve reducing conditions near the discharge end of a reduction kiln (provided the required kiln temperatures could be maintained) and that this in turn would give an improvement in product quality. Char is simply coal largely devoid of volatile matter but more importantly devoid of moisture. Moisture adversely affects the reducing atmosphere. Grey and Reid (Trans. Inst. Min. Metall. C, 1974, 83, 39–46) suggested the use of specially dried coal as a means of improving the reducing atmosphere. However drying coals of the type used in these reduction kiln operations presents technical difficulties, such as the risk of premature ignition and would add to the capital and operating costs. Char, on the other hand, is already produced within the synthetic rutile operation. Grey and Reid limited their suggestion to dried coal believing that the volatile matter was required for temperature control.

It will also be understood that by feeding both char and coal to the discharge end, preferred by Keran and Baker in the aforementioned U.S. patents, an objective of the present invention, that is an improvement in product quality, will not be achieved.

As mentioned earlier, in the known process the solids bed temperature near the discharge end of the kiln is typically in the range of 1130° C. to 1180° C. The temperature range is optimised for product quality. Unexpectedly, we have found that the optimum is lower on blown char operation, in the range of 1080° C. to 1150° C. but more particularly in the range of 1100° C. to 1140° C. The lower temperature range is a further indication of the stronger reducing conditions provided by blown char.

In the known process, the blown coal is conveyed first to a device 14 known as a fireman where it is mixed with the carrier air, such fireman devices being designed to avoid any back pressure. The coal/air mix is then fed into an open-ended straight injection pipe which protrudes slightly into the discharge end of the kiln. The injection pipe is normally at least 8 meters in length and of such small diameter that the coal is projected at high velocity into the kiln.

Any known device for pneumatically injecting (blowing) coal into the discharge end of a kiln, eg a fireman 14', may also be used for entraining and blowing char in the process of the present invention. We have found that, compared to blown coal, blown char is much easier to handle. The high moisture coals used in the known process often cause blockages in such devices, particularly during winter months, with consequent loss of production. As would be expected such problems do not occur with fine dry char.

For any fixed-sized kiln, the blown char feed rate is substantially less than the blown coal feed rate which it replaces. The blown char feed rate is typically, but not limited to, 35% to 68% of the blown coal feed rate, on a weight for weight basis. Despite the lower blown-char feed rate, compared to blown coal, we found it necessary to increase both the injection pipe diameter and the carrier air flow rate, in order to promote the combustion of blown char as a flame rather than landing and then burning on the kiln bed. As yet, we do not fully understand the relationship between injection pipe diameter and air flow rate necessary to ensure that the char burns largely as a flame. In our case, the injection pipe diameter and the carrier air flow rate were increased in such relative proportions as to decrease the superficial velocity of the air, superficial velocity meaning the standard cubic meters per hour of air divided by the cross-sectional area of the pipe. The required conditions can be determined fairly readily by visual inspection.

The following examples illustrate the improvement in synthetic rutile quality and the reduction in coal usage achieved by the present invention.

EXAMPLE 1

A rotary reduction kiln, measuring 62 meters long refractory lined to give an internal diameter of 4.6 meters, was changed from blown coal (FIG. 1) to blown char (FIG. 2) operation, in order to experimentally compare the two modes of operation with the reduced ilmenite being processed through the plant, including the acid leaching stage, to produce synthetic rutile product.

Comparisons are made below between the three weeks on blown coal operation immediately prior to the change with weeks 2 to 4 inclusive after the change. Discounting the first week of the blown-char trial allowed time for optimising kiln conditions and for processing the kiln material through to the final product.

During this period, ilmenite was sourced from the Eneabba Western ore body and had the average of daily analyses shown in Table 1. Coal was supplied from Collie field having the typical proximate analysis shown in Table 2.

TABLE 1

| Ilmenite Analysis | |
| --- | --- |
| COMPONENT AS OXIDES | % WEIGHT/WEIGHT |
| $TiO_2$ | 61.7 |
| FeO | 4.1 |
| $Fe_2O_3$ | 29.8 |
| MnO | 1.0 |
| $ZrO_2$ | 0.2 |
| $Al_2O_3$ | 0.7 |
| $SiO_2$ | 0.9 |

TABLE 2

| Coal Proximate Analysis, as received | |
| --- | --- |
| Free Moisture | 29% |
| Ash | 4% |
| Volatile Matter | 23% |
| Fixed Carbon | 44% |

Table 3 compares the average of the daily analyses of the synthetic ruffle product produced by the two modes of operation.

TABLE 3

| Comparison of Synthetic Rutile Product Analyses % | | |
| --- | --- | --- |
| | ON BLOWN COAL OPERATION | ON BLOWN CHAR OPERATION |
| $TiO_2$ | 91.60 | 93.13 |
| $Ti_2O_3$ | 4.3 | 8.2 |
| Total Fe | 2.77 | 2.13 |
| MnO | 0.7 | 0.7 |
| $ZrO_2$ | 0.1 | 0.1 |
| $Al_2O_3$ | 1.0 | 1.1 |
| $SiO_2$ | 1.4 | 1.3 |
| S | 0.5 | 0.4 |

Notes:
(a) $TiO_2$ is total titanium expressed as $TiO_2$.
(b) $Ti_2O_3$ is total reduced retiles expressed as $Ti_2O_3$.

Table 4 compares the reduction kiln feed rates as tonnes per hour (tph).

TABLE 4

| | ON BLOWN COAL OPERATION | ON BLOWN CHAR OPERATION |
| --- | --- | --- |
| Ilmenite | 22.0 | 22.0 |
| Feed end coal | 5.0 | 7.5 |
| Blown coal | 3.0 | Nil |
| Total coal | 8.0 | 7.5 |
| Feed end char | 2.0 | Nil |
| Blown char | Nil | See note (c) |
| Sulphur | 0.37 | 0.37 |

Notes: (c) After first week of comparison (second week of operation), blown char fixed at 2.0 tph.

EXAMPLE 2

A reduction kiln of the same dimensions as described in Example 1 was changed from blown coal to blown char to further compare the two modes of operation. During the comparison period, ilmenite was sourced from the Eneabba Northern ore body and had the average analysis shown in Table 5. Coal supplied from the Collie field had the typical proximate analysis shown in Table 2.

TABLE 5

Ilmenite Analysis

| COMPONENT AS OXIDES | % WEIGHT/WEIGHT |
|---|---|
| $TiO_2$ | 61.0 |
| FeO | 3.4 |
| $Fe_2O_3$ | 28.8 |
| MnO | 1.1 |
| $ZrO_2$ | 0.2 |
| $Al_2O_3$ | 0.8 |
| $SiO_2$ | 1.0 |

Samples of reduced ilmenite representing the average of each eight hour shift were subjected to a 5% sulphuric acid leach test. The 5% sulphuric acid leach test is commonly used in the industry as a means of assessing the final synthetic rutile quality potential of reduced ilmenite.

Table 6 shows in chronological order the results of the preceding four shifts on blown coal and the four shifts on blown char.

TABLE 6

| | 5% acid leach residue % $TiO_2$ |
|---|---|
| On blown coal | 92.5 |
| On blown coal | 92.6 |
| On blown coal | 92.6 |
| On blown coal | 92.5 |
| Changing to blown char | 92.7 |
| On blown char | 94.1 |
| On blown char | 94.0 |
| On blown char | 94.0 |
| On blown char | 94.1 |

Table 7 compares the various kiln feed rates as tonnes per hour.

TABLE 7

| | On Blown Coal Operation | On Blown Char Operation |
|---|---|---|
| Ilmenite | 22 | 22 |
| Feed end coal | 6.5 | 8.0 |
| Blown coal | 2.5 | nil |
| Total coal | 9.0 | 8.0 |
| Feed end char | 1.5 | nil |
| Blown char | nil | 1.2 |
| Sulphur | 0.37 | 0.37 |

I claim:

1. A process for treating titaniferous material by reducing iron oxides in the titaniferous material largely to metallic iron in a kiln, thereby producing a reduced titaniferous material, comprising feeding the titaniferous material and a particulate carbonaceous material to the kiln at one or more fee port means, recovering a mixture which includes the reduced titaniferous material and particulate char from the kiln at one or more discharge port means, separating at least a portion of the recovered particulate char from the reduced titaniferous material, and recycling at least a portion of the recovered separated char to the kiln in the region of said discharge port means, wherein said recycled char is fed to the kiln in the region of said discharge port means by blowing the char entrained in a fluid stream so that this blown char burns in said kiln largely as a flame in the region of said discharge port means.

2. A process according to claim 1, wherein said fluid stream is a gas.

3. A process according to claim 1, wherein said kiln is an elongated rotary kiln.

4. A process according to claim 3, wherein said feed and discharge port means are at or adjacent opposite ends of the kiln, thereby defining respective feed and discharge ends of the kiln, which is inclined to facilitate flow of the contents of the kiln from the feed end towards the discharge end.

5. A process according to claim 1, wherein said feed and discharge port means are at or adjacent opposite ends of the kiln, thereby defining respective feed and discharge ends of the kiln, and wherein substantially no carbonaceous material, other than the recovered char, is fed to the discharge end of the kiln.

6. A process according to claim 4, wherein said carbonaceous material is coal.

7. A process according to claim 4, wherein said recovered char has a mean particle diameter not greater than 2.0 mm.

8. A process according to claim 4, wherein the rate at which char is recycled is controlled so as to maintain the percentage ash content by weight of the recovered char less than 25%.

9. A process according to claim 8, wherein said percentage ash content is maintained in the range 5 to 15%.

10. A process according to claim 4, wherein the rate at which recovered char is blown into the kiln is controlled to maintain the ash content of the recovered char less than 25%.

11. A process according to claim 1, wherein said carbonaceous material is coal.

12. A process according to claim 1, wherein said recovered char has a mean particle diameter not greater than 2.0 mm.

13. A process according to claim 1, wherein the rate at which char is recycled is controlled so as to maintain the percentage ash content by weight of the recovered char less than 25%.

14. A process according to claims 13, wherein said percentage ash content is maintained in the range 5 to 15%.

15. A process according to claims 1, wherein the rate at which recovered char is blown into the kiln is controlled to maintain the ash content of the recovered char less than 25%.

16. A process according to claim 1, wherein the coal feed rate to the feed port means is adjusted to establish a char balance to produce just sufficient char after separation of the recovered char from the reduced titaniferous material for recycle as blown char.

17. A process according to claim 1, wherein said recovered mixture of the reduced titaniferous material and particulate char is separated in a dry separation step utilising at least two vibrating screens in series, and a plurality of magnetic separators in series.

18. A process according to claim 1, wherein the temperature of solid materials in the kiln adjacent the discharge port means is in the range 1080° C. to 1150° C.

19. A process according to claim 18, wherein said temperature of said solid materials is in the range 1100° C. to 1140° C.

20. Apparatus for treating titaniferous materials, by reducing iron oxides in the titaniferous material largely to metallic iron, thereby producing a reduced titaniferous material, comprising:
a kiln;
one or more feed port means for the kiln for feeding titaniferous material and a particulate carbonaceous material to the kiln; and one or more discharge port means for recovering a mixture which includes reduced ilmenite and particulate char from the kiln;

means to separate at least a portion of the recovered particulate char from said mixture and to recycle that portion to the kiln in the region of said discharge port means, which recycling means includes means to entrain said portion of the recovered particulate char in a fluid stream and means to blow said entrained char into the kiln;

wherein said separation and recycling means is such that the blown char burns in said kiln largely as a flame in the region of said discharge port means.

21. Apparatus according to claim 20, wherein said kiln is an elongated rotary kiln.

22. Apparatus according to claim 21, wherein said feed and discharge port means are at or adjacent opposite ends of the kiln, thereby defining respective feed and discharge ends of the kiln, which is inclined to facilitate flow of the contents of the kiln from the feed end towards the discharge end.

23. Apparatus according to claim 20, wherein said separation means comprises dry separation means including at least two vibrating screens in series, and a plurality of magnetic separators in series.

24. Apparatus according to claim 21, wherein said feed and discharge port means are at or adjacent opposite ends of the kiln, thereby defining respective feed and discharge ends of the kiln, wherein the apparatus is configured so that substantially no recovered char is recycled to the feed end of the kiln.

25. Apparatus according to claim 24, wherein the apparatus is further configured so that substantially no carbonaceous material, other than recovered char, is fed to the discharge end of the kiln.

26. Apparatus according to claim 21, wherein said feed and discharge port means are at or adjacent opposite ends of the kiln, thereby defining respective feed and discharge ends of the kiln, and wherein the apparatus is configured so that substantially no carbonaceous material, other than recovered char, is fed to the discharge end of the kiln.

27. A process according to claim 1, further including initially controlling the feed rate of the titaniferous material in order to maintain temperatures at a level to facilitate establishment of said recovering, separating and recycling steps with the covered recycled char burning in the kiln largely as a flame in the region of said discharge port means.

28. A process according to claim 7, further including initially controlling the feed rate of the titaniferous material in order to maintain temperatures at a level to facilitate establishment of said recovering, separating and recycling steps with the covered recycled char burning in the kiln largely as a flame in the region of said discharge port means.

29. A process according to claim 8, further including initially controlling the feed rate of the titaniferous material in order to maintain temperatures at a level to facilitate establishment of said recovering, separating and recycling steps with the covered recycled char burning in the kiln largely as a flame in the region of said discharge port means.

30. A process according to claim 9, further including initially controlling the feed rate of the titaniferous material in order to maintain temperatures at a level to facilitate establishment of said recovering, separating and recycling steps with the covered recycled char burning in the kiln largely as a flame in the region of said discharge port means.

31. A process according to claim 1, wherein the titaniferous material is a titaniferous ore.

32. A process according to claim 1, wherein the titaniferous material is ilmenite.

33. A process according to claim 1, wherein said feed and discharge port means are at or adjacent opposite ends of the kiln, thereby defining respective feed and discharge ends of the kiln and wherein substantially no recovered char is recycled to the feed end of the kiln.

34. A process according to claim 5, wherein substantially no carbonaceous material, other than the recovered char is fed to the discharge end of the kiln.

* * * * *

UNITED STATES PATENT AND TRADEMARK OFFICE
CERTIFICATE OF CORRECTION

PATENT NO. : 5,403,379

DATED : April 4, 1995

INVENTOR(S) : Ivan W. George

It is certified that error appears in the above-indentified patent and that said Letters Patent is hereby corrected as shown below:

Col. 2, line 43, "convened" should be --converted--.

Col. 5, line 20, insert "maintained" before --along--.

Col. 11, line 53, "fee" should be --feed--.

Col. 12, line 39, Claim 14, "claims" should be --claim--.

Col. 12, line 41, Claim 15, "claims" should be --claim--.

Signed and Sealed this

Twenty-sixth Day of September, 1995

Attest:

BRUCE LEHMAN

*Attesting Officer*        *Commissioner of Patents and Trademarks*